June 8, 1937.  E. G. JURGENS ET AL  2,083,268
DEPOSITING MACHINE
Filed March 5, 1936  7 Sheets-Sheet 1

Inventors
Emil G. Jurgens
Hazen K. Becker
by Rummler Rummler & Woodworth
Attys.

June 8, 1937.  E. G. JURGENS ET AL  2,083,268
DEPOSITING MACHINE
Filed March 5, 1936   7 Sheets-Sheet 6

Inventors
Emil G. Jurgens
Hazen K. Becker
by: Rummler Rummler & Woodworth
Attys.

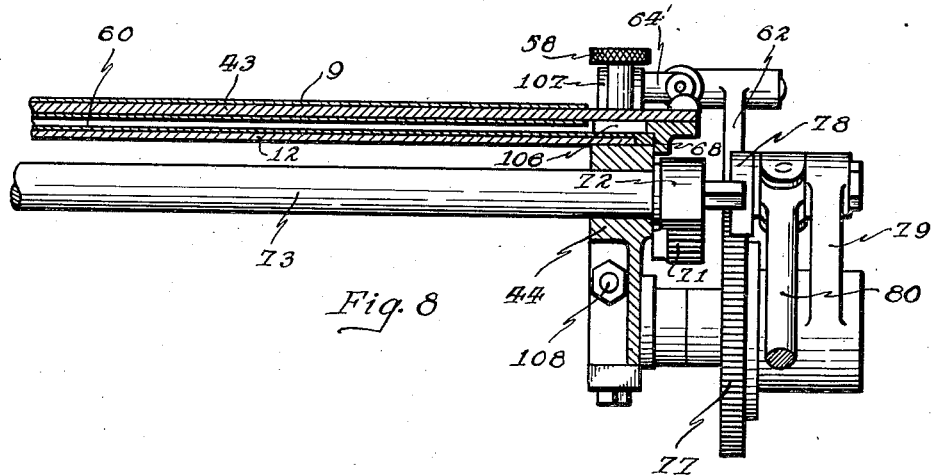
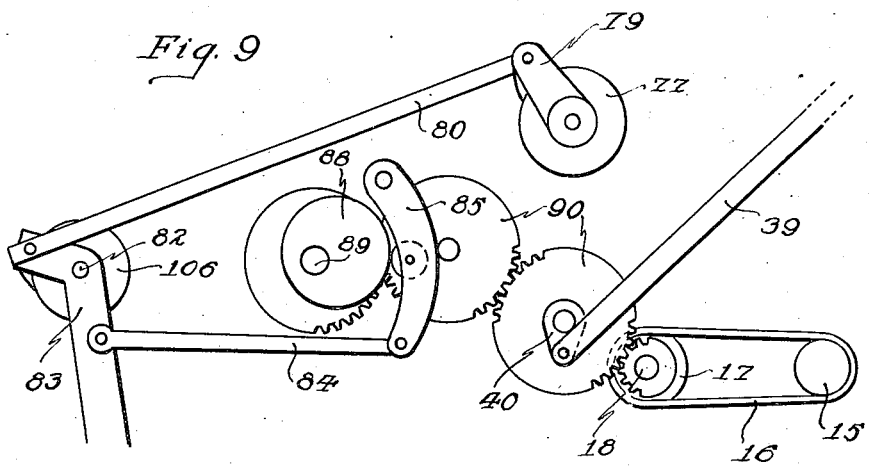

Patented June 8, 1937

2,083,268

UNITED STATES PATENT OFFICE 2,083,268

DEPOSITING MACHINE

Emil G. Jurgens and Hazen K. Becker, Chicago, Ill., assignors to Peters Machinery Company, Chicago, Ill., a corporation of Illinois Application March 5, 1936, Serial No. 67,268

2 Claims. (Cl. 107—28)

This invention relates to improvements in the Westerman depositing machine, the general arrangement of which and many details thereof are disclosed in Patents Nos. 1,121,431; 1,121,432; 1,121,433; 1,121,434; Re. No. 13,999; 1,290,444; 1,392,034; 1,420,797; to F. Westerman.

The purposes of the present invention are mainly to simplify and to structurally improve machines of the class mentioned, to increase their speed and output, to improve the quality of the work, and also to lessen the number of attendants required in operating the machine. This is accomplished by a change in the part of the construction having to do mainly with the delivery of cakes in successive transverse rows to a depositing mechanism which delivers to each cake a measured quantity of one or more coating substances, such as marshmallow, or the like.

In the machine as described in the above mentioned patents, there is a receiving platform upon which the cakes are sorted out by hand and pushed on to an upper shelf of a series of stepped shelves which are surfaced with relatively reciprocating shelves and the reciprocating shelves alternately slide rearward beneath the cakes received thereon and then forwardly engaging the edges of the cakes and pushing them over the edge of a step to the one beneath it.

By a series of such actions the cakes are worked forwardly to the depositing means and brought into proper alinement therewith and while on the way defective ones are discarded by hand and the spaces filled with other cakes so as to insure the absence of any blank spaces. It is also necessary to see that none of the cakes go in upside down. Thus the machine required the attention of several operators.

Now it is proposed to provide the machine with a supply magazine which receives the cakes or cookies in vertical rows and with an improved feed mechanism which automatically separates and properly spaces the cakes on a single belt. The belt carries the cakes forward to a receiving means which reciprocates to place the cakes row by row beneath the depositing mechanism.

The purposes of the invention are attained by means of a mechanism as illustrated in the accompanying drawings wherein:

Fig. 8 is a fragmentary sectional view taken on the line 8—8 of Fig. 7.

Fig. 9 is a diagrammatic detail of part of the main drive mechanism.

The Westerman depositing machines are of heavy construction because of the over-all dimensions thereof, and the necessity of operating upon extremely viscous material, but such part of the machine to which the present invention relates, and having to do merely with the spacing and feed of the objects coated, may be relatively light and easily capable of maintaining a speed coordinated with the maximum speed at which the plungers in the depositing mechanism may be operated.

The old parts of the machine, which are not detailed herein, but which are described in the before mentioned patents, include mainly a multiple hopper construction containing the various viscid coating materials, together with feed plunger, measuring and cutoff devices.

One peculiar requirement of the machine is that after the cakes have been coated it is necessary to move the cakes downward away from the coating means before the cakes are moved forward toward the discharge end of the machine. This is necessary because of the elasticity of the coating material, and it is necessary to break the threads thereof by a downward pull, so that no part of the coating material will fall over on the edge of the cake.

With this requirement in view the feed belt which carries the cakes from the supply magazine and a belt which receives the cakes are mounted upon a frame structure which swings up and down around a center at one end.

The belts of the machine are driven by ratchet mechanism to impart intermittent motion thereto in a continuous direction. Other cooperating feed devices of the machine are reciprocating. These devices consist of serrated slides, one of which removes the lowermost cakes from the supply magazine chutes and the other of which receives the lateral rows of cakes, one row at a time from the belt and places them beneath the coating nozzles.

Figure 1:
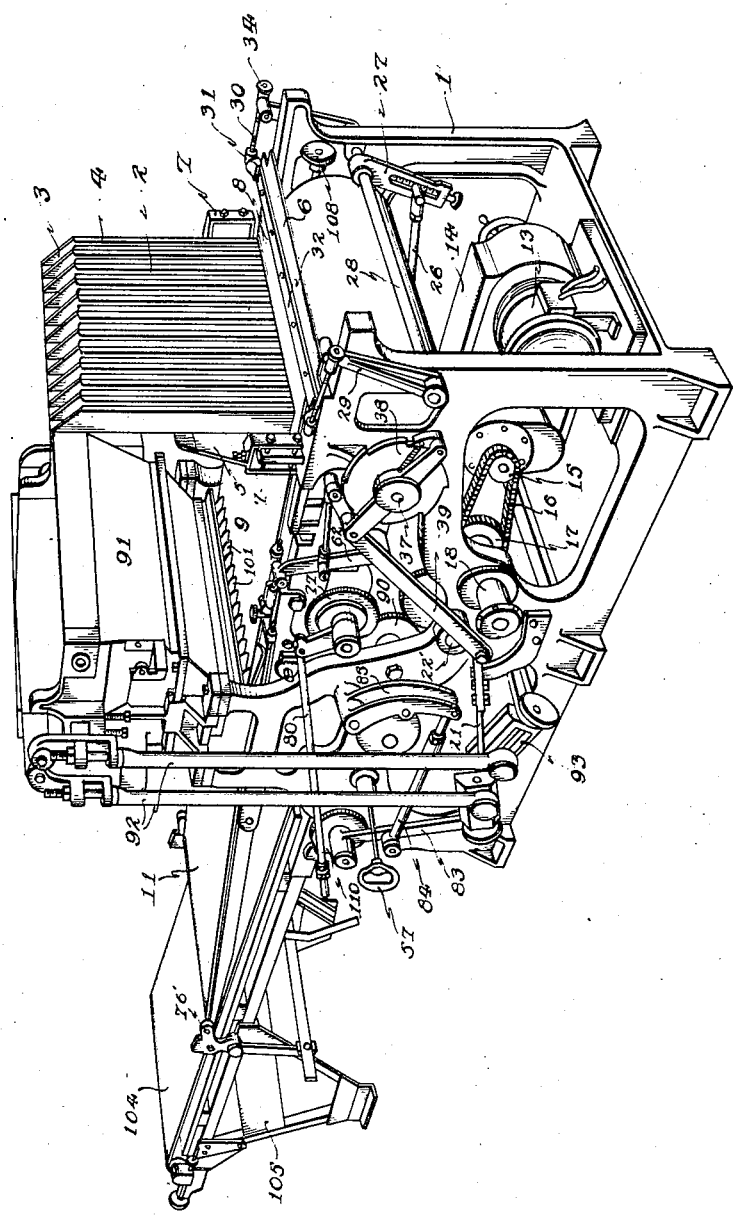
Figure 1 is a perspective view of the improved machine.

The main frame 1 of the machine, Fig. 1, supports at its front end a magazine 2, formed by a number of separable chutes for the rows of cakes which are placed in or mechanically fed into the upper end of the magazine. The chutes 3 are flanged, as shown at their forward ends 4 and are secured to a rear plate 5 of the magazine. The cakes are therefore guided by walls on all four sides as they move down by gravity to a supporting plate 6, Fig. 3. The mounting for the magazine permits both of its rapid removal and replacement by a magazine of different form, and its adjustment vertically, laterally, and forwardly and rearwardly, in a support 7, for the purpose of correctly positioning the magazine with reference to a serrated slide 8 which travels back and forth over the plate 6 for the purpose of removing the lowermost series of cakes from the magazine and placing them in a horizontal transverse row on a belt 9. Some of the cakes are indicated on the belt at 10 and coated ones at 10' on a discharge belt 11.

The drive mechanism for the belts 9 and 11, the serrated feed plate 8 and a similar serrated plate 12 which receives and places the cakes beneath the coating spouts, receives power from a motor 13, Fig. 1. This motor through a speed changing and reduction gearing in casing 14 drives a sprocket 15. The sprocket 15 is connected by a chain 16 with a sprocket 17 which is loose upon the main drive shaft 18.

Figure 5:
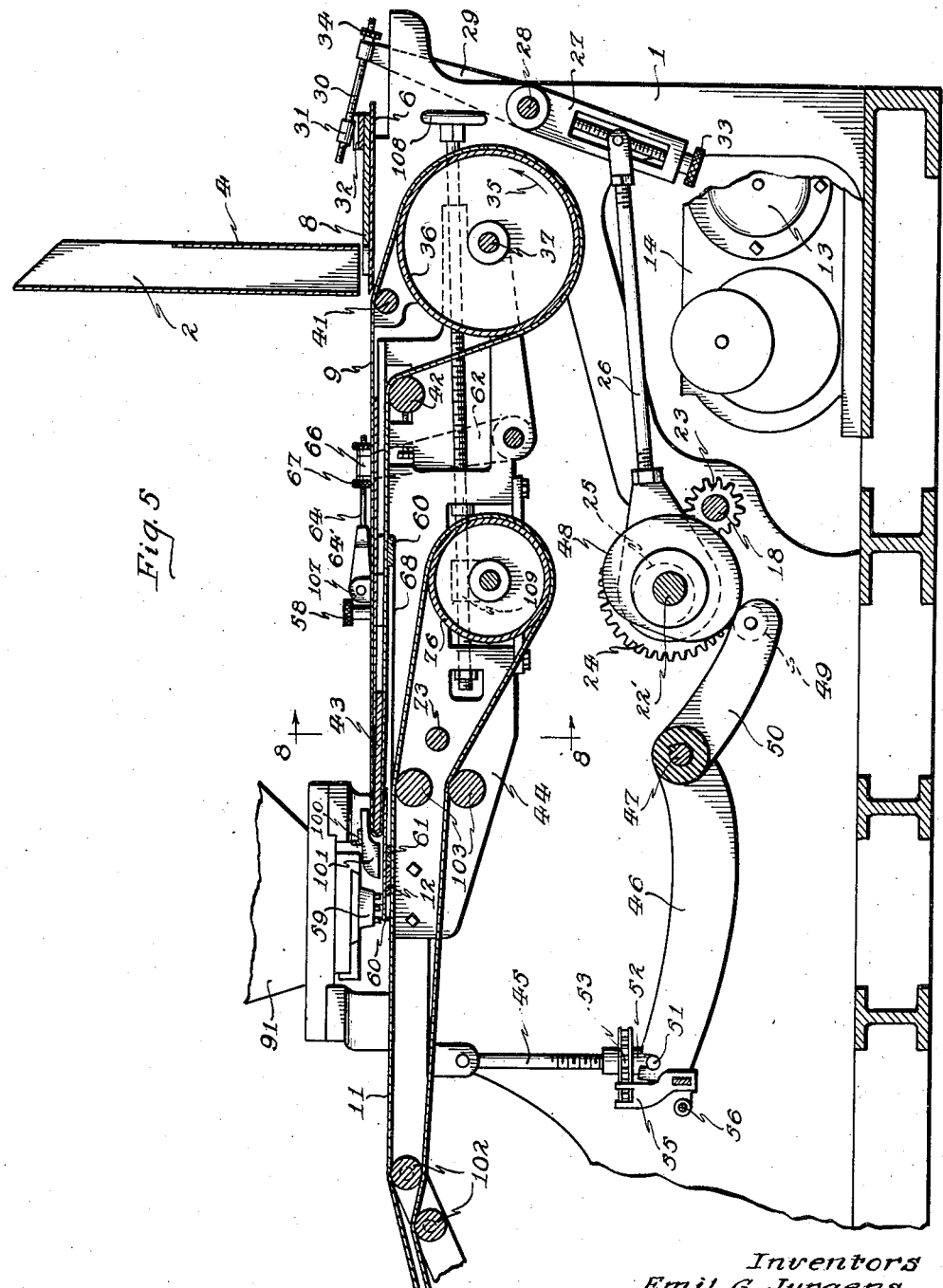
Fig. 5 is a sectional view like Fig. 4 but shows the oscillating table which carries the feed belt in its upper position rather than in its lower position as shown in Fig. 4. Also in Fig. 5 some of the parts shown in Fig. 4 are not repeated.
Figure 6:
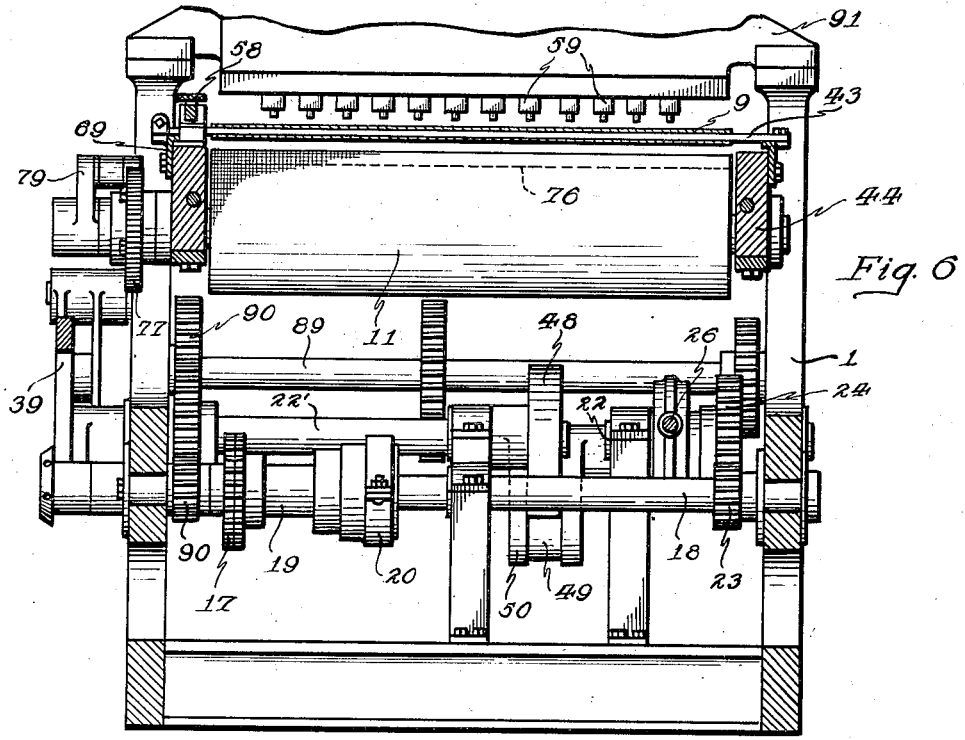
Fig. 6 is a transverse vertical section as indicated by the line 6—6 on Fig. 2, but with the coating supply hopper shown broken away.

Rotatable with the sprocket 17 is a sleeve 19, Fig. 6, which carries a clutch 20 for connecting it with the shaft 18. This clutch is operated by hand lever 21, Figs. 1 and 2. When the clutch is in and shaft 18 is driven, motion is transmitted from shaft 18 to another drive shaft 22, Fig. 5, through the pinion 23 and gear 24. Shaft 22 carries an eccentric 25 by means of which a pitman 26 is reciprocated and serves to oscillate arm 27 fast to a transverse shaft 28. This shaft carries the arms 29 which at their upper ends are linked by the threaded rods 30 to collars 31 swiveled at the sides of a transverse bar 32 to which the serrated feed plate 8 is attached. The stroke of the pitman is regulated by screw 33, and the nuts 34 on the threaded bars 30 enable forward and backward adjustment of bar 8, with reference to its operating mechanism.

The serrated feed bar 8 serves to successively place uniformly spaced rows of cakes on the feed belt 9 which carries the cakes to the serrated placing bar 12. The drive roller 36 for the belt 9 is fast to a transverse shaft 37. This shaft is intermittently driven, in the direction indicated by arrow 35, through the ratchet 38, Fig. 2, and a link connection 39 with crank 40 fast to shaft 22.

The belt 9 is guided around rollers 41 and 42 and around a transverse plate 43, all of which are supported on a frame structure 44 which is supported at one end on shaft 37, and may oscillate up and down around this shaft.

The forward end of the frame 44 through posts 45 which are pivotally connected with the frame, rests upon arms 46 which are keyed to a transverse shaft 47. This shaft is oscillated to swing the frame or table structure 44 up and down around the shaft 37 by a cam 48, which is secured to a drive shaft 22', and operates on a roller 49 carried by arm 50 fast to shaft 47.

Figure 4:
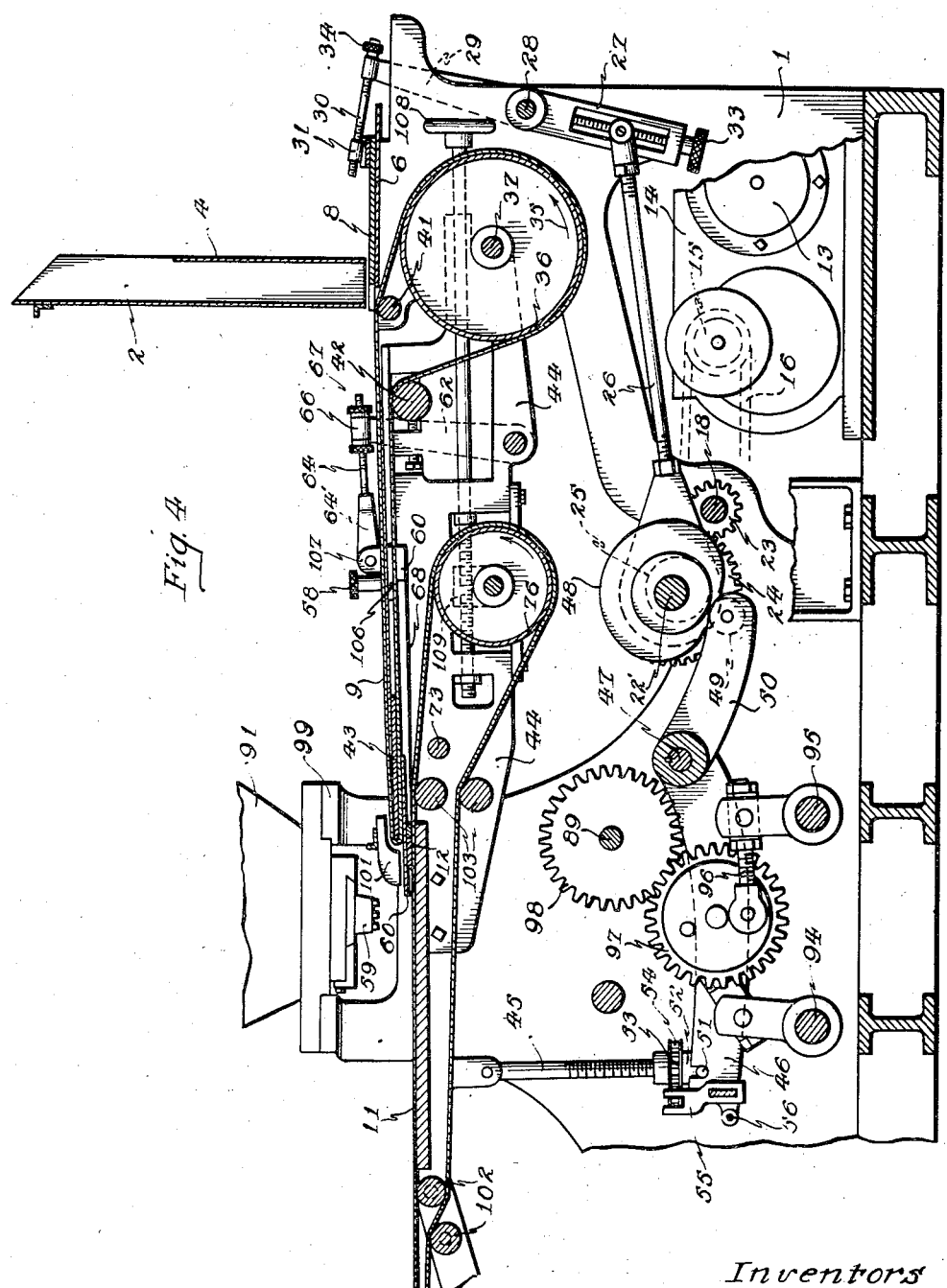
Fig. 4 is a longitudinal section taken on the line 4—4 of Fig. 3.

The connection between arms 46 and the posts 45 are the pins 51 on collars 52, shown in Fig. 4. These collars may be shifted up and down on the posts 45 to change the effective length of the latter by means of sprockets 53 which carry the collars, and are threaded to the posts, and connected together by a chain 54. The latter is fixed to fork 55 which is used for operating the chain to effect vertical adjustment of the table 44, by means of a rod 56, having the operating handle 57, Fig. 1.

The toothed pusher plate 12 is slidably mounted between the belt 9 and a belt 11 and when the pusher plate 12 is in its rear position a row of cakes passes from plate 60 which receives from belt 9 to belt 11 at locations which bring the cakes between the teeth of the pusher plate when the latter advances and positions the cakes beneath a row of nozzles 59. The coating material is fed through nozzles onto the cakes when the latter are so positioned.

Figure 2:
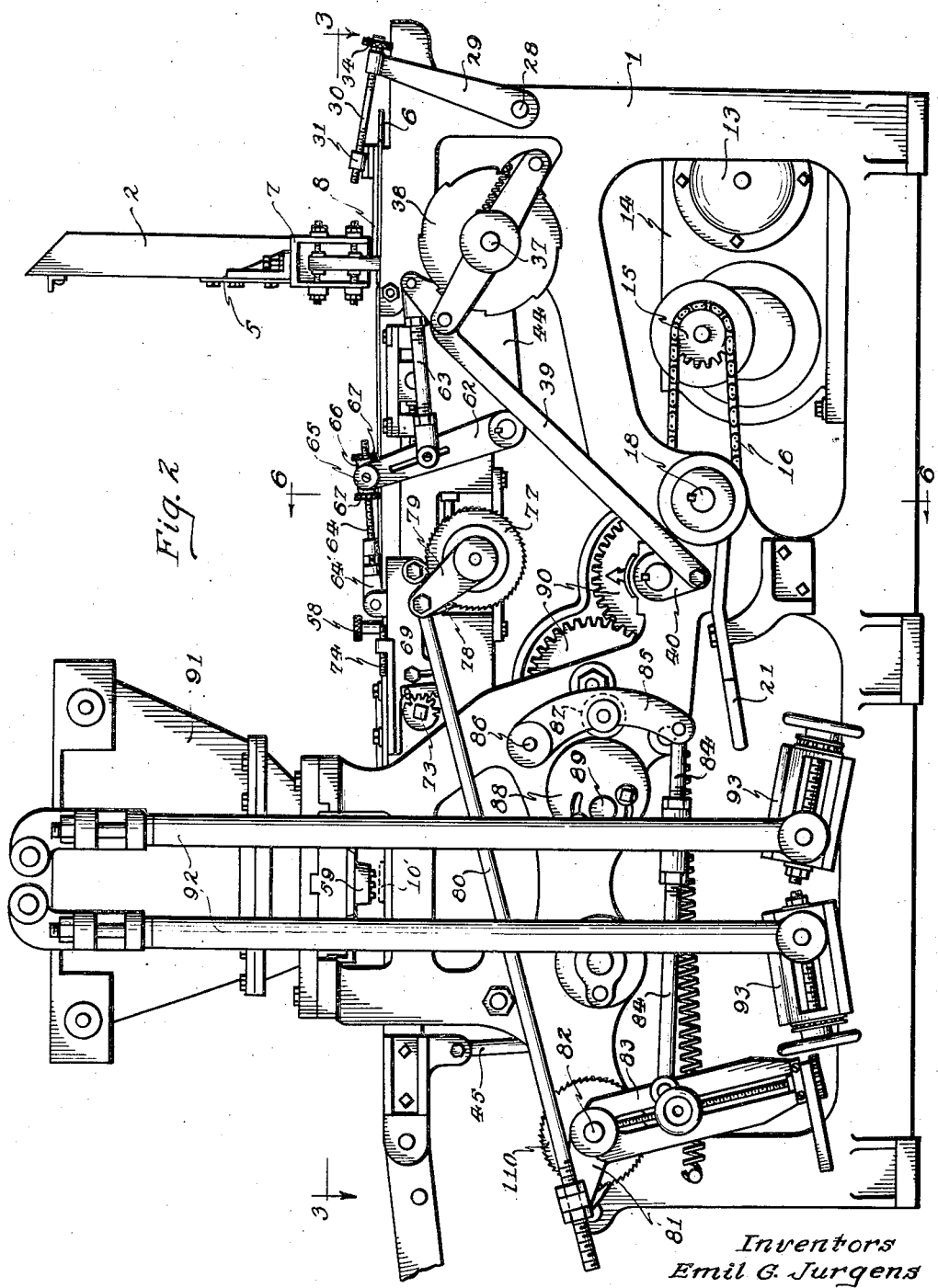
Fig. 2 is an enlarged side view of the machine with one end partly broken away.
Figure 3:
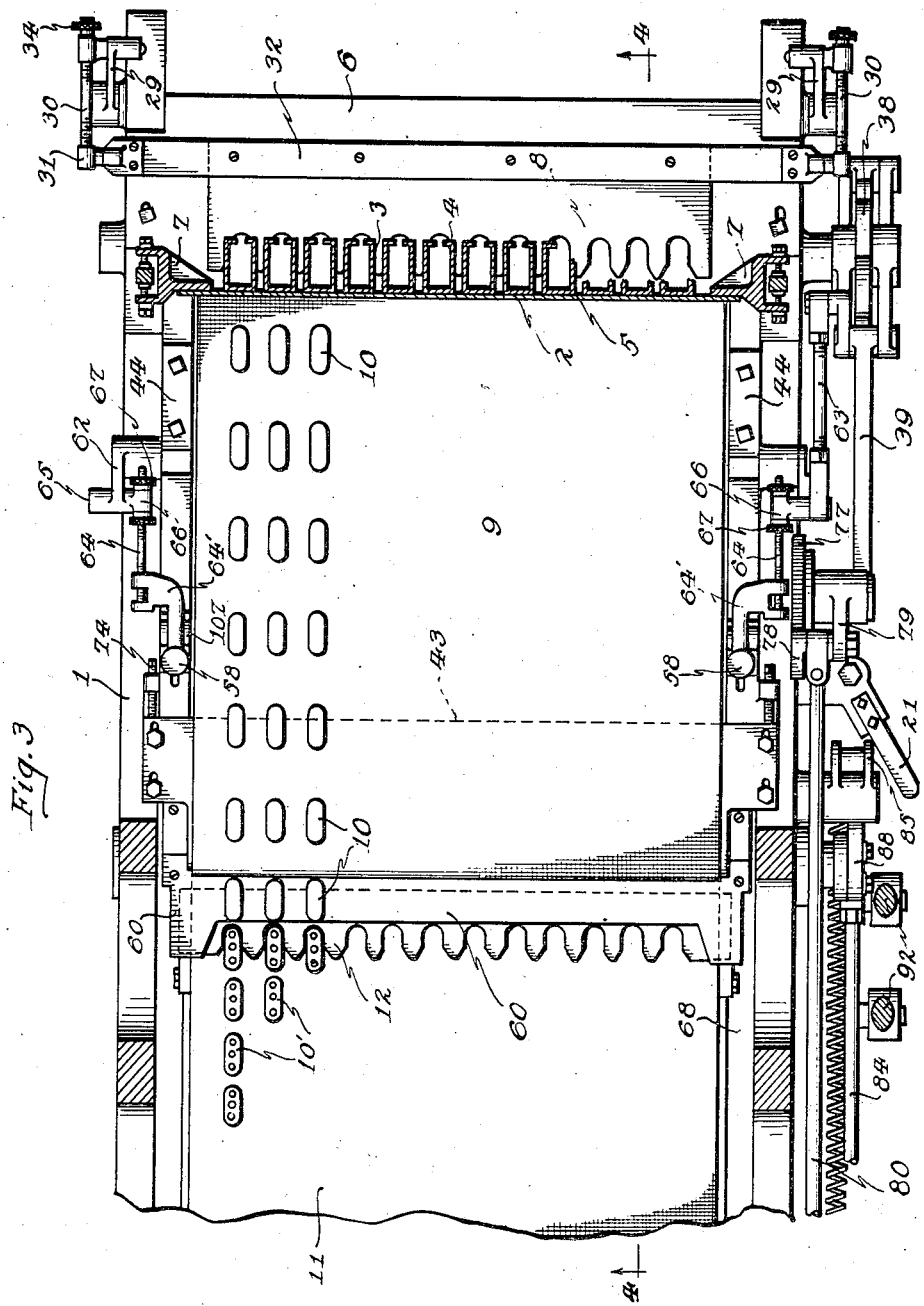
Fig. 3 is a plan view of the mechanism shown in Fig. 2 but partly in section as indicated by the line 3—3 on Fig. 2.

The means for reciprocating pusher plate 12 includes plate 60 which is flanged around the sides of plate 12 and carries a transverse bar 61 for engaging the back of plate 12. The means for reciprocating the pusher plate holder, Figs. 2, 3 and 4, are the oscillating arms 62, one of which has an operative link connection 63 with the pitman 39. The reciprocating holder 60 is connected to the upper ends of arms 62 by connections with links 64 pivoted at 65 to arm 62. The pivot is carried by a collar 66 and by means of the nuts 67 links 64 may be adjusted in the collar for the purpose of positioning the plate holder and hence the plate 12 forwardly or rearwardly with reference to its operating mechanism. This adjustment is needed because the toothed positioning plates 12 are varied in form and size according to the size and form of the cakes it is desired to have the machine work on.

The reciprocating plate holder 60 slides along ways 68 on the pivoted frame 44 and through screws 58 is secured to bar 106 having ears 107 pivoted to element 64'.

Figure 7:
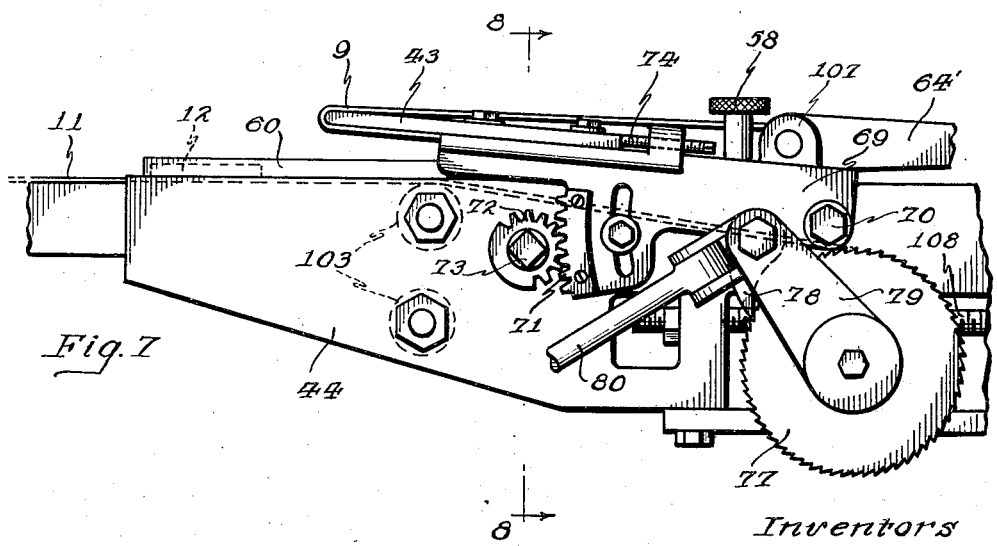
Fig. 7 is an enlarged detail view illustrating the manner in which the forward end of the feed belt is adjustably supported.

In order to replace toothed plate 12 by another it is necessary to lift the holder 60 and in order to get the belt supporting plate 43 out of the way the latter is mounted on a structure 69, Fig. 7, which is pivoted by bolts 70 to the frame 44. The structure 69 carries toothed segments 71 at its sides which mesh with pinions 72 on a shaft 73 in frame 44. By placing a wrench on one of the square ends of shaft 73 the shaft may be rotated to lift structure 69 and the belt guide 43 carried thereby.

Belt 9 is tightened by means of screws 74 acting upon the belt guide plate 43 and belt 11 is tightened by adjustment screws 108 acting on bearings 109 for belt roller 76.

The belt 11 is also intermittently operated and timed so as to be at rest during the intervals that coatings are placed upon the cakes when beneath the spouts 59. The belt 11 travels around the rollers 76, Fig. 4, and 76', Fig. 1. The driven roller 76 is rigid with a ratchet 77, Fig. 7, which ratchet is engaged by a pawl 78 on the arm 79 and the arm 79 is oscillated around the roller support by a link 80 connecting it with an arm 81, Fig. 2, pivoted at 82 and rigid with arm 83 connected by link 84 with an operating arm 85 pivoted to the machine frame at 86.

Roller 87 on arm 85 is engaged by eccentric 88 carried by a transverse shaft 89. This shaft is connected by gearing 90, Fig. 6, with drive shaft 18. The same gearing serves to drive shaft 22' which is not made continuous with shaft 22 in order to allow for quick removal of cam 48 and replacement with another of different throw.

The supply of coating material is carried by hopper construction 91 and the plungers for forcing measured quantities of the material through the nozzles 59 are operated by the vertically reciprocating bars 92, Fig. 2. At their lower ends, these bars are adjustably connected to arms 93 fast to shafts 94 and 95, Fig. 4, and these shafts are oscillated by crank connections 96 with a gear 97 meshing with gear 98 on shaft 89.

A transversely extending angle iron 100 carries a series of spacing fingers 101 having the function of lining the cakes as they leave belt 9 and are placed on pusher plate holder 60.

When the frame 44, Fig. 4, is oscillated around the shaft 37 in order to carry the cakes downwardly away from the depositing nozzles 59, belt 11 swings downwardly around the forward supporting roller therefor 76', Fig. 1.

The intermediate guide rollers 102 and 103 for belt 11 are carried by the frame structure 44 and thus move up and down with the frame. Beneath the belt 11 is another belt 104 which is supported on a separate detachable frame 105 and has the function of supporting trays at the delivery end of belt 11 for receiving the coated cakes in rows and for this reason belt 104 is intermittently driven by ratchet 110, Fig. 2. The trays are placed on belt 104 beneath the belt 11 and are removed from the belt 104 after they have passed beyond the delivery end of belt 11.

In the operation of the machine, the cakes for receiving deposits are fed by gravity from magazine 2 to the supporting table 6 from which they are pushed in rows onto belt 9 by the serrated pusher plate 8. The belt carries the rows of cakes placed thereon step-by-step forwardly to between the alining fingers 101 at which point the cakes pass from belt 9 to support 60 and to belt 11, which is also intermittently driven and, as aided by the serrated pusher plate 12, serves to bring the rows of cakes successively beneath nozzle 59 and to pass the deposit carrying cakes onwardly to the discharge end of the machine; but the movement of the cakes away from nozzle 59 is first downwardly so that the threads of deposit material will be broken in this direction and not tend to drop over the sides of the cakes.

This downward movement is accomplished by rocking frame 44 around axis of shaft 37 and as the frame constitutes the support for one end of belt 11, the belt is swung down around its end supporting roller 76', Fig. 1.

This rocking belt supporting frame structure enables the necessary actions to be performed with rapidity and accuracy without the use of the stepped reciprocating feeding means heretofore used on the Westerman machine.

We claim:

1. A depositing machine of the class described having mounted thereon a supply magazine for the objects which receive deposits and a depositing mechanism, a belt carrying frame mounted on said supporting frame for oscillation thereon and beneath said magazine and said depositing mechanism, driven belt supporting rollers and belts thereon carried by said belt supporting frame, one belt being located below and extending beyond the other, means for intermittently driving said belts, and pusher bars operating in timed relation with said belts for removing the objects for receiving the deposits in successive rows from said magazine and for aiding the belts in placing said objects beneath the depositing mechanism.

2. In a depositing machine of the class described a supporting frame structure, a belt carrying frame pivotally mounted thereon and having belt guide and feed rollers and a plate thereon around which a belt may travel, a belt passing over said rollers and plate, said plate being pivotally supported, means for lifting and lowering said plate on its support, and pusher mechanism mounted on said belt carrying frame beneath said plate.

EMIL G. JURGENS.
HAZEN K. BECKER.